J. JOHNSON.
Manger.
No. 58,263.   Patented Sept. 25, 1866.
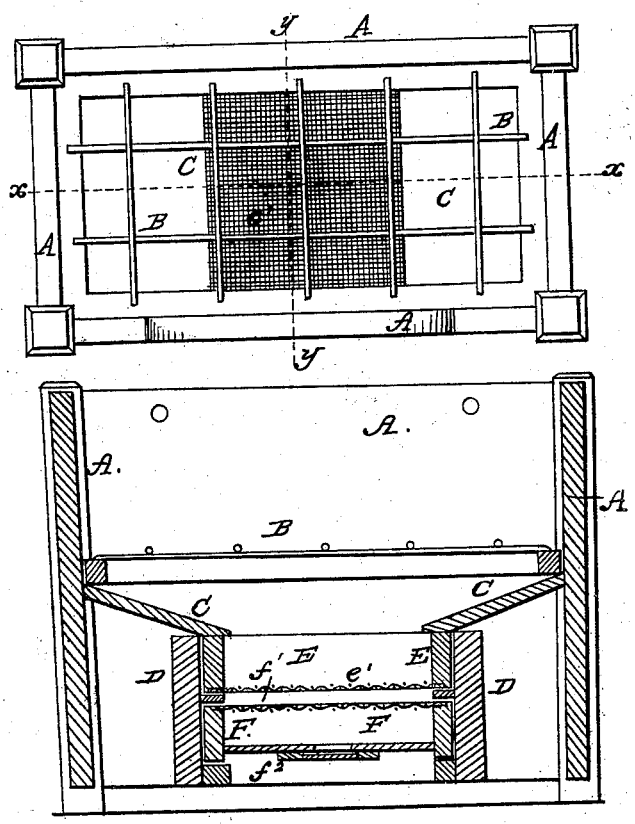
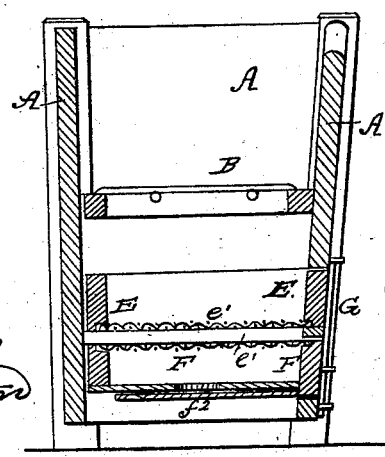

UNITED STATES PATENT OFFICE.

JONATHAN JOHNSON, OF KENT, INDIANA.

IMPROVEMENT IN MANGERS.

Specification forming part of Letters Patent No. 58,263, dated September 25, 1866.

*To all whom it may concern:*

Be it known that I, JONATHAN JOHNSON, of Kent, in the county of Jefferson and State of Indiana, have invented a new and useful Improvement in Mangers; and I do hereby declare that the following is a full, clear, and exact description thereof, which will enable others skilled in the art to make and use the same, reference being had to the accompanying drawings, forming part of this specification, in which—

Figure 1 is a top view of my improved manger. Fig. 2 is a vertical longitudinal section of the same, taken through the line $x\ x$, Fig. 1. Fig. 3 is a vertical cross-section of the same, taken through the line $y\ y$, Fig. 1.

Similar letters of reference indicate like parts.

My invention has for its object to furnish an improved manger, by means of which the manger may be kept free from short hay, chaff, &c., and the grass-seed separated from the short hay and chaff, so that it be ready for re-sowing when taken from the manger; and it consists, first, in the combination, with the box of the manger, of a coarse screen, which will allow the seed, chaff, and short hay to pass through it, but will stop the hay; second, in the combination of two inclined planes or chutes with the box of the manger, to guide the seed, chaff, and short hay to the screen placed in the central part of the manger; third, in the combination, with the manger and with the drawer-frame, of a drawer or box screen which will allow the seed to pass through, but will retain the chaff and short hay; fourth, in the combination,with the manger, of a drawer, in the upper or middle part of which is a screen, which will detain any chaff or short hay that may find its way through the screen next above it, and allow the seed only to pass through into the lower part of said drawer, the parts being constructed and arranged as hereinafter more fully described.

A is the box or body of the manger, which is made in the ordinary form. At a distance below the top of the manger A such that the manger may contain as much hay as it is desired to feed to the animal at one time I place a coarse screen, B, with meshes of such a size as will allow the seed, chaff, and short hay to pass through, but will detain the hay. This screen may rest upon the upper edges of the inclined planes or chutes C, or upon any other suitable supports. C are two inclined planes or chutes, the upper edges of which rest against the ends of the box A, as shown, and their lower edges upon the upper edges of the frame D, in which the drawers slide.

E is a drawer, the bottom $e'$ of which is a screen, the meshes of which are so fine as to detain the chaff and short hay, but will allow the grass-seed to pass through. This drawer must be taken out and emptied as often as may be necessary.

F is a drawer, placed immediately beneath the drawer E, in the upper or middle part of which is placed a screen, $f'$, to intercept and detain any chaff or short hay that may pass through the screen $e'$, the grass-seed passing through into the lower part of the said drawer F.

In the bottom of the drawer F is a hole closed by a slide, $f^2$, for convenience in removing the grass-seed from said drawer when required. The drawers E and F slide in the frame D in the ordinary manner, and they may be secured in place by buttons or by a bar, G, passing through staples in the front sides of said drawers, as shown in Fig. 3.

The drawings represent the screen $f'$ as being placed at the top of the drawer F; but I prefer to place it near the middle of said drawer, so as to obtain more space between the screens $e'$ and $f'$.

I claim as new and desire to secure by Letters Patent—

1. The combination, with the manger A, of the coarse screen B, substantially as described, and for the purpose set forth.

2. The combination of the screen-bottomed drawer E with the drawer-frame D and manger A, substantially as described, and for the purpose set forth.

3. The combination of the screen-drawer F, constructed as described, with the drawer-frame D and manger A, substantially as and for the purpose set forth.

JONATHAN JOHNSON.

Witnesses:
 JOSEPH HYTER,
 ISAAC N. BARKER.